United States Patent

[11] 3,622,454

[72] Inventor Leonard Keay
　　　　　　Florissant, Mo.
[21] Appl. No. 854,299
[22] Filed Aug. 29, 1969
[45] Patented Nov. 23, 1971
[73] Assignee Monsanto Company
　　　　　　Saint Louis, Mo.

[54] PROCESS FOR THE PREPARATION OF DEXTROSE USING ALPHA AMYLASE
6 Claims, No Drawings

[52] U.S. Cl. .................................................. 195/31
[51] Int. Cl. .................................................. C12b 1/00
[50] Field of Search .................................... 195/31, 11, 17; 99/141, 142

[56] References Cited
OTHER REFERENCES

Seikagaku Fine Biochemicals, Miles Laboratories.
Fukumoto et al., Chem. Abs., Vol. 47, No. 10,575.
Fukumoto et al., Chem. Abs., No. 7,138 e, 1952.

*Primary Examiner*—A. Louis Monacell
*Assistant Examiner*—Gary M. Nath
*Attorneys*—Lynden N. Goodwin, James W. Williams, Jr. and Neal E. Willis ABSTRACT: Dextrose solutions having high dextrose content (in excess of about 85 percent dextrose weight based on the weight of the dry substance in the solution) are obtained by treating an aqueous starch solution with alpha amylase derived from the organism *Bacillus subtilis* var. *amylosacchariticus*.

3,622,454

PROCESS FOR THE PREPARATION OF DEXTROSE USING ALPHA AMYLASE

BACKGROUND OF THE INVENTION

1. Field of the Invention

This invention relates to a process for the preparation of dextrose. In a particular aspect, this invention is related to a one-step process for the preparation of high dextrose content dextrose solutions.

2. Description of the Prior Art

Dextrose solutions having dextrose equivalents (D.E.) of up to about 42 have been prepared by a one-step procedure involving the treatment of an aqueous starch suspension with alpha amylase preparations obtained from various micro-organisms including strains of *Bacillus subtilis*. Such a procedure is described in U.S. Pat. No. 3,265,586 issued Aug. 9, 1966, to C. E. Land and R. R. Barton. The dextrose content (D) of such solutions is typically approximately one-half the D.E. of the solution. The D.E. of a dextrose-containing solution is defined as the total reducing sugar expressed as dextrose and calculated as a weight percentage of the dry solids of the solution.

In the commercial preparation of dextrose solutions having high dextrose contents (upwards of 50 percent by weight dextrose based on the dry substance in the solution) it has been necessary first to thin or "liquify" the aqueous starch suspension with acid or an alpha amylase preparation and then saccharify the thinned starch with an amyloglucosidase enzyme preparation. Liquefaction of starch by the action of the enzyme alpha amylase is well-known to the art and is described in detail by Kerr, Chemistry and Industry of Starch, Academic Press, 1950, pp. 412–420, and by Whistler and Paschall, Starch Chemistry and Technology, Volume 1, Academic Press, 1965, pp. 158–162. The preparation of high dextrose content dextrose solutions by the "dual enzyme" procedure (liquefaction of starch with alpha amylase followed by saccharification of the liquified starch with amyloglucosidase) is also well-known to the art and is described in U.S. Pat. No. 3,280,006 issued Oct. 18, 1966 to T. L. Hurst and A. W. Turner. Although the above-referred-to two-step procedures for preparing high dextrose content dextrose solutions from starch have been generally successful in their employment, it remains desirable to provide the art with a simplified one-step procedure for preparing such solutions.

SUMMARY OF THE INVENTION

It is the object of the present invention to provide a process for the preparation of dextrose.

It is a further object of the present invention to provide a process for the preparation of high dextrose content dextrose solutions by a one-step enzymatic procedure.

Other objects and advantages of the present invention will be apparent from the specification and the appended claims.

It has been found in accordance with the present invention that high dextrose content dextrose solutions are prepared by subjecting an aqueous starch suspension to the hydrolytic action of alpha amylase obtained from the organism *Bacillus subtilis* var. *amylosacchariticus*.

DETAILED DESCRIPTION

In carrying out the process of the present invention, an aqueous suspension of starch, typically containing up to about 50 percent starch dry substance, is treated with alpha amylase prepared from the organism *Bacillus subtilis* var. *amylosacchariticus* for a period of time and under hydrolytic conditions to obtain a dextrose solution having a dextrose content of at least 50 percent. By the procedure of the present invention, solutions having dextrose contents approaching 100 percent (85–99 percent) may be obtained.

The alpha amylase enzyme composition which has been found effective in the process of the present invention is available from Miles Laboratories Incorporated, Elkhart, Ind. as "alpha amylase (saccharifying) *Bacillus subtilis* var. *amylosacchariticus* FUKOMOTO."

The temperature employed in the process of the present invention may vary over a wide range with a temperature in the range of from about 30° to about 95° C. being typically employed. Temperatures below about 30°C. are generally not preferred because of the slow rate of hydrolysis of the starch while temperatures over about 95° C. should generally be avoided in order to minimize inactivation of the alpha amylase. A temperature in the range of from about 60° to about 90° C. is generally preferred.

The pH of the aqueous starch suspension may also vary and is typically maintained in the range of from about 5 to about 8.0 and preferably in the range of from about 6.0 to about 7.0.

The reaction time required in the process of the present invention is a critical feature and in all cases must be sufficient to permit a dextrose content of at least 50 to be obtained. The time employed will vary and will depend principally on the temperature of the starch suspension, the amount of enzyme employed in the reaction, the starch concentration in the suspension and the particular starch source (corn, wheat, rice, etc.). A reaction time in the range of from about 12 to about 96 hours is generally employed.

The amount of alpha amylase employed in the process of the present invention will vary depending among other things, upon the concentration of starch in the suspension, the final dextrose content desired and the activity of the particular alpha amylase sample employed. Determination of a suitable amount of alpha amylase to be employed in the process of the present invention is readily within the skill of the art.

In the process of the present invention, it is generally preferred to include in the aqueous starch suspension small amounts of a material, or materials, for improving the stability of the alpha amylase, especially at higher temperatures. Examples of such materials include water soluble salts of sodium such as for example, sodium chloride, and the like.

The word "starch" is used herein in a generic sense. Any variety of starch or mixture of starches may be employed in the process of the present invention, including corn, rice, wheat, sorghum, etc., and the like. Because of its low cost and ready availability, corn starch is preferred.

A particular advantage of the present invention is that dextrose solutions are obtained from which crystalline dextrose may be recovered in high yields (dextrose solutions containing upwards of about 85 percent D.). To obtain crystalline dextrose from such solutions, the hydrolysate is refined, then concentrated, and dextrose is separated from the solution by crystallization followed by centrifugation using equipment and general procedures well known in the dextrose-refining art.

The invention will be understood more fully by reference to the following specific examples. It is understood that the examples are presented for the purpose of illustration only and are not intended as a limitation of the invention.

In the examples the enzyme employed is twice crystallized alpha amylase prepared by fermentation of the organism *Bacillus subtilis* var. *amylosacchariticus*. The enzyme was obtained from Miles Laboratories Incorporated.

EXAMPLE 1

A starch gel (aqueous suspension) was prepared by adding 35 g. of powdered pearl starch (corn) to 80 ml. of boiling water. Sufficient boiling water was then added to give a total volume of 100 ml. The thus-formed gel was allowed to cool on standing to about 85°–90° C. Alpha amylase enzyme (25 mg.) was then added with stirring to the gel. The gel liquefied immediately upon addition of the alpha amylase. After addition of the enzyme, the resulting liquified suspension was allowed to cool to about 70° C. The cooled suspension was then stirred while maintaining the temperature at approximately 70° C. for about 44 hours to obtain a syrup having a D.E. of 96 and a D. of 94.

EXAMPLE 2

The procedure of example 1 was repeated in all essential details with the exception that stirring at 70° C. was conducted for 20 hours instead of 44 hours. A syrup having a D.E. of 87 and a D. of 64 was obtained.

EXAMPLE 3

A starch gel was prepared by adding 20 g. powdered pearly starch (corn) to 90 ml. of boiling water. Sufficient water was then added to give a volume of 100 ml. The gel was allowed to cool on standing to about 85° C. Alpha amylase (5 mg.) was added with stirring to the gel. The gel liquified almost immediately upon addition of the alpha amylase. After addition of enzyme, the resulting liquid suspension was allowed to cool to about 70° C. The cooled material was then stirred at approximately 70° C. to obtain a syrup having a dextrose content of about 99.

EXAMPLE 4

The procedure of example 3 is repeated in all essential details with the exception that starch derived from wheat is employed instead of starch derived from corn to obtain a high dextrose content dextrose solution.

EXAMPLE 5

The procedure of example 3 is repeated in all essential details with the exception that starch derived from rice is employed instead of starch derived from corn to obtain a high dextrose content dextrose solution.

EXAMPLE 6

To a suspension of starch (0.5 percent dry substance Lintner alpha amylase (0.1 mg.)/ml.) was added to a suspension of starch (0.5 percent dry substance Lintner soluble) in 0.05 M acetate buffer and the resulting solution was stirred for 2½ hours to obtain a syrup having a D.E. of 80 and a D. of 66. Throughout the 2½ hour period, the solution was maintained at about 37° C. The solution was then maintained at 37° C. for an additional 17½ hours. At the completion of the 17½ hours period the syrup had a D. of 90.

Since many embodiments of this invention may be made and since many changes may be made in the embodiments described, the foregoing is to be interpreted as illustrative only and the invention is defined by the claims appended hereto.

What I claim is:

1. A process for the production of dextrose solution which consists essentially of subjecting an aqueous starch suspension to the hydrolytic action of alpha amylase derived from the organism *Bacillus subtilis* var. *amylosachariticus* for a period of time sufficient to provide a solution having a dextrose content of at least 85 percent by weight based on the weight of the dry substance in the solution.

2. The process of claim 1 wherein the pH of the suspension is in the range of from about 5.0 to about 8.0.

3. The process of claim 2 wherein the pH of the suspension is in the range of from about 6.0 to about 7.0.

4. The process of claim 1 wherein the temperature of the suspension is in the range of from about 30° to about 90° C.

5. The process of claim 4 wherein the temperature of the suspension is in the range of from about 60° to about 90° C.

6. The process of claim 1 wherein the said time is in the range of from about 12 to about 96 hours.

* * * * *